United States Patent [19]

Yonezawa et al.

[11] Patent Number: 5,466,289

[45] Date of Patent: Nov. 14, 1995

[54] ULTRA HIGH-STRENGTH HYDRAULIC CEMENT COMPOSITIONS

[75] Inventors: Toshio Yonezawa; Kenrou Mitsui; Makoto Nakazima, all of Tokyo; Mitsuo Kinoshita, Aichi; Toshihide Shimono, Aichi; Tsuneo Yamamoto, Aichi, all of Japan

[73] Assignees: Takenaka Corporation; Takemoto Yushi Kabushiki Kaisha, both of Japan

[21] Appl. No.: 123,461

[22] Filed: Sep. 17, 1993

[30] Foreign Application Priority Data

Sep. 30, 1992 [JP] Japan ................................. 4-286762
Aug. 30, 1993 [JP] Japan ................................. 5-238740

[51] Int. Cl.$^6$ ................................................. C04B 24/16
[52] U.S. Cl. ...................... 106/809; 106/708; 106/726; 106/737; 106/790; 106/823; 524/3; 524/650
[58] Field of Search ............................ 106/789, 802, 106/725, 726, 737, 738, 809, 817, 823, 790, 708; 524/3, 2, 650

[56] References Cited

U.S. PATENT DOCUMENTS 4,808,641  2/1989  Yagi et al. ........................ 106/809
5,087,648  2/1992  Kinoshita et al. .................. 106/809
5,290,869  3/1994  Kinoshita et al. .................. 524/3

Primary Examiner—Mark L. Bell
Assistant Examiner—Michael Marcheschi
Attorney, Agent, or Firm—Majestic, Parsons, Siebert & Hsue

[57] ABSTRACT

Ultra high-strength hydraulic cement compositions with extremely low water-to-cement ratio of 10–30% and having high fluidity and improved capability of preventing slump loss, from which high-quality ultra high-strength hardened concrete and mortar can be obtained with superior workability, contain a binder composed of cement or a mixture of cement and a microscopic powder admixture, aggregates, water and a cement dispersion agent composed of water-soluble vinyl copolymers obtained by aqueous solution radical polymerization of five specified kinds of monomers at a ratio within a specified range. The unit content of the binder is 400–1300kg/m$^3$, the water-to-binder ratio is 10–30% and the content of cement dispersion agent is 0.1–2.0 weight parts for 100 weight parts of the binder.

16 Claims, No Drawings

ULTRA HIGH-STRENGTH HYDRAULIC CEMENT COMPOSITIONS

BACKGROUND OF THE INVENTION

This invention relates to ultra high-strength hydraulic cement compositions with significantly improved fluidity and workability adapted for use in the production of ultra high-strength concrete and mortar.

In order to produce high-strength concrete, it has been known to reduce the water-to-cement ratio and to make up for the resultant lowering of its fluidity by using a cement dispersion agent such as condensation products of naphthalene sulfonic acid and formaldehyde, condensation products of melamine sulfonic acid and formaldehyde or water-soluble vinyl copolymers (U.S. Pat. No. 4,962,173 and Japanese Patent Application Tokkai 3-93660). For the purpose of production of high-strength concrete, it has also been known to reduce the water-to-cement ratio and to use a microscopic powder admixture such as silica fume or blast-furnace slag in addition to cement (Japanese Patent Publications Tokko 60-59182 and Tokkai 3-93660).

If such a prior art method is used for the production of an ultra high-strength hydraulic cement composition from which high quality ultra high-strength hardened concrete with compressive strength greater than 1100kgf/cm$^2$ can be obtained by keeping the water-to-cement ratio extremely low, however, it is not possible to obtain sufficiently large fluidity, and the drop in its fluidity with the passage of time after the mixing (hereinafter referred to as the slump loss) is significantly large. In other words, only compositions with poor fluidity and workability, having no practical use, can be obtained.

SUMMARY OF THE INVENTION

The problem to be solved by the present invention is, as discussed above, that prior art methods for producing ultra high-strength hydraulic cement compositions cannot yield sufficient fluidity, but the slump loss is large, and only compositions with extremely poor fluidity and workability and having no practical use can be obtained.

The present inventors discovered, as a result of their diligent research in order to find solutions to this problem, that use as cement dispersion agent should be made of a water-soluble vinyl copolymer obtained by aqueous solution radical copolymerization of five specified kinds of monomers at specified ratios of copolymerization and by setting the unit content of a binder, the water-to-binder ratio and the content of the cement dispersion agent with respect to the binder each within a specified range.

DETAILED DESCRIPTION OF THE INVENTION

This invention relates to an ultra high-strength hydraulic cement composition comprising a binder composed of cement or a mixture of cement and a microscopic powder admixture, aggregates, water and a cement dispersion agent, characterized wherein the unit content of the binder is 400–1300kg/m$^3$, the water-to-binder ratio is 10–30%, the content of the cement dispersion agent is 0.1–2.0 weight parts with respect to 100 weight parts of the binder, and the cement dispersion agent is a water-soluble vinyl copolymer obtained by aqueous solution radical copolymerization of a first monomer shown by Formula (1) given below, a second monomer shown by Formula (2) give below, a third monomer shown by Formula (3) given below, a fourth monomer shown by Formula (4) given below and a fifth monomer shown by Formula (5) given below such that the ratio of constituent monomer units is (First monomer)/(Second monomer)/(Third monomer)/(Fourth monomer)/(Fifth monomer)= 45–65/8–23/3–25/5–25/0.1–15 (molar %) as converted to monomers, where:

Formula (1) is

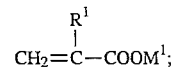

Formula (2) is

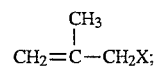

Formula (3) is

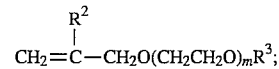

Formula (4) is

Formula (5) is

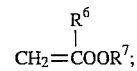

where $R^1$, $R^2$, $R^3$, $R^4$ and $R^6$ are each H or $CH_3$; $R^5$ and $R^7$ are each an alkyl group with 1–3 carbon atoms; $M^1$ is an alkali metal, an alkaline earth metal, ammonium or organic amine; m is an integer 1–30; n is an integer 5–25; X is $-SO_3M^2$ or an organic group shown by

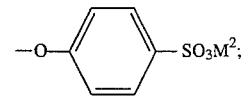

where $M^2$ is one selected from the group consisting of alkali metals, alkaline earth metals, ammonium and organic amines.

The binder to be used according to the present invention is either cement or a mixture of cement and a microscopic powder admixture. Examples of cement which may be used include many kinds of portland cement such as ordinary portland cement, high early strength portland cement and moderate heat portland cement, fly ash cement, blast furnace cement, silica cement and many kinds of blended cement. Examples of microscopic powder admixture include silica fume, blast-furnace slag and fly ash. It is preferable, however, to use a mixture of cement and silica fume as the binder. In this situation, it is preferable if the content of silica fume is 1–30 weight % of the binder and it is even more preferable if it is 3–25 weight %. There is no particular limitation as to the kind or characteristics of the silica fume, but use is usually made of silica fume having hyaline silicon dioxide as its principal component and having average diameter of 0.01–1 μm.

The water-soluble vinyl copolymer, serving as cement dispersion agent according to the present invention, is obtained by aqueous solution radical copolymerization of a first monomer shown by Formula (1), a second monomer shown by Formula (2), a third monomer shown by Formula (3), a fourth monomer shown by Formula (4) and a fifth monomer shown by Formula (5). Examples of the first monomer shown by Formula (1) include salts of alkali metals, salts of alkaline earth metals and alkanol amine salts of (meth)acrylic acid. Examples of the second monomer shown by Formula (2) include (i) methallylsulfonates such as alkali metal salts, alkaline earth metal salts and alkanol amine salts of methallylsulfonic acid; and (ii) p-methallyloxybenzene sulfonates such as alkali metal salt, alkaline earth metal salts and alkanol amine salts of p-methallyloxybenzene sulfonic acid. Examples of the third monomer shown by Formula (3) include polyethyleneglycol mono(meth) allylether and methoxy polyethyleneglycol (meth)allylether each with molar number of additive ethylene oxide within the range of 1–30 and preferably 5–25. Examples of the fourth monomer shown by Formula (4) include alkoxy polyethyleneglycol (meth)acrylates such as (meth) acrylates of methoxy polyethyleneglycol, ethoxy polyethyleneglycol, propoxy polyethyleneglycol and isopropoxy polyethyleneglycol each with the molar number of additive ethylene oxide within the range of 5–25. Examples of the fifth monomer shown by Formula (5) include alkyl-(meth)acrylates such as methyl(meth)acrylate, ethyl (meth)acrylate, propyl(meth)acrylate and isopropyl-(meth)acrylate.

As explained above, the water-soluble vinyl copolymers, serving as cement dispersion agents according to the present invention, are obtained by aqueous solution radical copolymerization of first, second, third, fourth and fifth monomers respectively shown by Formulas (1), (2), (3), (4) and (5), but their copolymerization ratio (as converted to these monomers) is in the range of (First monomer)/(Second monomer)/(Third monomer)/(Fourth monomer)/(Fifth monomer)= 45–65/8–23/3–25/5–25/0.1–15 (molar %) and more preferably in the range of 50–62/10–20/5–20/7–20/1–12 (molar %). If the ratio of any of these monomers falls out of the given range, the water-soluble vinyl copolymer which is obtained cannot exhibit the desired effects as a cement dispersion agent. Among the water-soluble vinyl copolymers thus obtained, those with average numerical molecular weight within the range of 2000–20000 (Pullulan converted by GPC method) are desirable from the point of view of fluidity provided to ultra high-strength hydraulic cement compositions when this is used as a cement dispersion agent and the effect on prevention of slump loss.

Of the five kinds of monomers shown by Formulas (1)–(5) above, the second and third monomers shown by Formulas (2) and (3) are particularly important. If methallylsulfonate and p-methallyloxybenzene sulfonate are used simultaneously as a second monomer shown by Formula (2), in particular, the water-soluble vinyl monomer thereby obtained can provide even more improved fluidity to cement compositions mixed with microscopic powder admixtures such as silica fume, blast-furnace slag and fly ash as binder. The third monomer shown by Formula (3) serves to provide high fluidity to ultra high-strength hydraulic cement compositions with extremely low water-to-cement ratio.

The water-soluble vinyl copolymers to be used as a cement dispersion agent according to the present invention are obtained by aqueous solution radical copolymerization of the monomers described above at specified copolymerization ratios in the presence of a radical initiator. As for the method of copolymerization, it is important to use water or a mixture of water and a water-soluble organic solvent in an aqueous solution polymerization process. This may be done, for example, by first dissolving each monomer in water and preparing an aqueous solution containing each monomer with total content of 10–45%. Next, this aqueous solution is kept in a nitrogen gas, and a radical initiator is added for a radical copolymerization reaction at 50–70° C. for 5–8 hours to obtain a water-soluble vinyl copolymer. There is no limitation as to the kind of radical initiator to be used for this purpose as long as it is dissociated at the temperature of copolymerization reaction to initiate radical polymerization, but it is preferable to use a water-soluble radical initiator. Examples of such water-soluble radical initiator include potassium persulfate, ammonium persulfate, hydrogen peroxide and 2,2'-azobis(2-amidinopropane) dihydrochloride. They can also be used as a redox initiator by combining with a reducing agent such as sulfites and L-ascorbic acid or an amine.

Ultra high-strength hydraulic cement compositions according to the present invention are characterized not only as comprising a binder, aggregates, water and a cement dispersion agent but also wherein the unit content of the binder is 400–1300kg/m$^3$, the water-to-binder ratio is 10–30%, and the content of the cement dispersion agent is 0.1–2.0 weight parts, or preferably 0.2–1.8 weight parts, per 100 weight parts of the binder. If the ultra high-strength hydraulic cement composition is a concrete composition, it is preferable to adjust the unit content of the binder to 500–800kg/m$^3$ and to make the water-to-binder ratio equal to or greater than 15% and less than 25%, or even more preferably in the range of 15–20%. If the unit content of the binder is less than 400kg/m$^3$, desired ultra high-strength hardened concrete and mortar cannot be obtained. If it exceeds 1300kg/m$^3$, on the other hand, the process of mixing by kneading itself becomes difficult. If the water-to-binder ratio is less than 10%, the process of mixing by kneading becomes difficult, and if it exceeds 30%, desired ultra high-strength hardened concrete and mortar cannot be obtained. If the content of cement dispersion agent per 100 weight parts of the binder is less than 0.1 weight part, it is not possible to obtain desired ultra high-strength hydraulic cement compositions with sufficient fluidity and effects of preventing slump loss. If it exceeds 2 weight parts, on the other hand, setting retardation becomes great and affects the hardening process adversely. In some situations, there may even be an occurrence of segregation, and desired high-quality ultra high-strength hardened concrete and mortar cannot be obtained.

In order to provide a desired level of ultra high strength to ultra high-strength hydraulic cement compositions of the present invention, it is important to adjust the amount of entrained air appropriately. According to the present invention, the amount of entrained air is generally less than 2% and, more preferably, adjusted in the range of 0.7–1.5%. In order to adjust the amount of entrained air appropriately, ultra high-strength hydraulic cement compositions of the present invention may further contain an antifoaming agent.

Examples of such antifoaming agent include polyoxyalkylene-glycol monoalkyl ethers and polyoxyalkyleneglycol monoalkenyl ethers such as those obtained by adding alkylene oxide such as ethylene oxide and propylene oxide to aliphatic alcohol with 12–20 carbon atoms, but those with alkylene oxide formed by block addition of ethylene oxide and propylene oxide are preferred. This invention does not provide limitations as to the molar numbers of added ethylene oxide and propylene oxide, but 2–10 moles of ethylene oxide and 30–50 moles of propylene oxide are usually added to one mole of aliphatic alcohol. Practical examples of antifoaming agent include polyoxyethylene (6 mole)/polyoxypropylene (40 mole) block oleyl ether.

The content of the deforming agent should be as little as possible. It is generally adjusted to be less than 0.03 weight % with respect to the binder, or more preferably less than 0.02 weight %. Ultra high-strength hydraulic cement compositions of the present invention containing an antifoaming agent can produce even higher-quality ultra high-strength hardened concrete and mortar because unstable entrained air can be effectively eliminated.

The invention will be described below by way of examples but these examples are not intended to limit the scope of the invention. In what follows, "parts" will mean "weight parts" and "%" will mean "weight %" except where the amount of air is considered.

EXAMPLES

Part 1 (Synthesis of Water-Soluble Vinyl Copolymers As Cement Dispersion Agents) Synthesis of Water-Soluble Vinyl Copolymer (A-1)

Methacrylic acid 54 parts (0.628 moles), sodium methallylsulfonate 18 parts (0.114 moles), sodium p-methallyloxybenzene sulfonate 10 parts (0.04 moles), polyethyleneglycol (with n=8, where n signifies throughout herein the molar number of added ethylene oxide) monoallylether 40 parts (0.098 moles), methoxypoly-ethyleneglycol (n=23) methacrylate 128 parts (0.120 moles), methyl acrylate 11 parts (0.128 moles) and ion exchange water 260 parts were placed inside a flask and dissolved with stirring. Next, a 30% aqueous solution of sodium hydroxide 84 parts was added to neutralize the methacrylic acid until the pH value of the reacting system was adjusted to 8.5. Next, the temperature of the reacting system was kept at 60° C. by means of a warm bath, and after the interior of the reacting system was replaced by nitrogen gas, a 20% aqueous solution of ammonium persulfate 30 parts was added as polymerization initiator to start polymerization. After four hours of reaction, a 20% aqueous solution of ammonium persulfate 15 parts was further added and the reaction was continued for three more hours to complete the polymerization. A 30% aqueous solution of sodium hydroxide was added for neutralizing acid decomposition products and a reaction product was obtained by completely neutralizing the reaction system. In order to remove monomers which have not reacted, the product was condensed by means of an evaporator, and after it was precipitated in petroleum ether and filtered, it was vacuum-dried to obtain refined water-soluble vinyl copolymer (A-1) 275 parts.

Water-soluble vinyl copolymer (A-1) was analyzed by UV absorption, NMR, atomic light absorption, elemental analysis, GPC and titration methods. It was learned that its carboxyl value was 128. Its sulfur content was 1.74% and $Na_2O$ content 8.8% by an elemental analysis. The content of sodium p-methallyloxybenzene sulfonate was 3.5% by UV absorption. It was learned from the NMR analysis that its copolymerization ratio (as converted to each monomer) was (sodium methacrylate)/(sodium methallylsulfonate)/(sodium p-methallyloxybenzene sulfonate)/(polyethyleneglycol (n=8) monoallylether)/(methoxypolyethyleneglycol (n=23) methacrylate)/(methyl acrylate)=56/10/3.5/9/10.5/11 (molar ratio) and the average numerical molecular weight was 3600 (hereinafter Pullulan converted by GPC method).

Synthesis of Water-Soluble Vinyl Copolymers (A-2)–(A-5) and (R-1)–(R-7)

As in the case of water-soluble vinyl copolymer (A-1) described above, water-soluble vinyl copolymers (A-2)–(A-5) listed in Table 1 and water-soluble vinyl copolymers (R-1)–(R7) listed in Table 2 were obtained.

TABLE 1

| | Kinds of monomer and their copolymerization ratio (molar %) | | | | | | | | | Average |
|---|---|---|---|---|---|---|---|---|---|---|
| | Monomer-a | | Monomer-b | | Monomer-c | | Monomer-d | | Monomer-e | Molecular |
| Kind | a-1 | a-2 | b-1 | b-2 | c-1 | c-2 | d-1 | d-2 | e-1 | Weight |
| A-1 |  | 56 | 10 | 3.5 | 9 |  | 10.5 |  | 11 | 3600 |
| A-2 |  | 60 | 8 | 5 | 15 |  | 10 |  | 2 | 5600 |
| A-3 |  | 55 | 13 |  | 12 |  | 12 |  | 8 | 2900 |
| A-4 |  | 51 | 11 |  |  | 15 |  | 20 | 3 | 8400 |
| A-5 | 61 |  | 9 | 3 |  | 10 | 11 |  | 6 | 12000 |

TABLE 2

| | Kinds of monomer and their copolymerization ratio (molar %) | | | | | | | | | Average |
|---|---|---|---|---|---|---|---|---|---|---|
| | Monomer-a | | Monomer-b | | Monomer-c | | Monomer-d | | Monomer-e | Molecular |
| Kind | a-1 | a-2 | b-1 | b-2 | c-1 | c-2 | d-1 | d-2 | e-1 | Weight |
| R-1 |  | 70 |  |  |  |  | 30 |  |  | 8000 |
| R-2 |  | 60 | 10 |  |  |  | 20 |  | 10 | 3500 |
| R-3 |  | 60 |  |  | 20 |  | 10 |  | 10 | 10000 |
| R-4 | 50 |  | 2 |  |  | 33 | 15 |  |  | 4500 |
| R-5 | 35 |  |  | 20 | 10 |  |  | 15 | 20 | 25000 |
| R-6 |  | 63 | 8 |  |  |  | 29 |  |  | 5800 |
| R-7 | 70 |  | 12 |  |  |  |  | 18 |  | 7500 |

TABLE 2-continued

| | Kinds of monomer and their copolymerization ratio (molar %) | | | | | | | | | Average Molecular Weight |
|---|---|---|---|---|---|---|---|---|---|---|
| | Monomer-a | | Monomer-b | | Monomer-c | | Monomer-d | | Monomer-e | |
| Kind | a-1 | a-2 | b-1 | b-2 | c-1 | c-2 | d-1 | d-2 | e-1 | |

In Tables 1 and 2:
Monomers-a, -b, -c, -d and -e: Monomers shown by Formulas (1), (2), (3), (4) and (5), respectively;

a-1: Sodium acrylate;
a-2: Sodium methacrylate;
b-1: Sodium methallylsulfonate;
b-2: Sodium p-methallyloxybenzene sulfonate;
c-1: Polyethyleneglycol (n=8) monoallyl ether;
c-2: Polyethyleneglycol (n=4) monoallyl ether;
d-1: Methoxypolyethyleneglycol (n=23) methacrylate;
d-2: Methoxypolyethyleneglycol (n=9) methacrylate;
e-1: Methyl acrylate.

Synthesis of antifoaming agent

Oleyl alcohol 75 g and potassium hydroxide 3.2 g were placed inside an autoclave with a stirrer, and after its interior was replaced by nitrogen gas and ethylene oxide 75 g was pressed in for addition under a condition of 120°–140° C. and 1–5kg/cm$^2$G, propylene oxide 670 g was introduced for block addition. Next, the alkaline catalyst was adsorbed by magnesium silicate powder to obtain ethylene oxide (6 moles) and propylene oxide (40 moles) adduct of oleyl alcohol as reaction product.

(Part 2 (Preparation and Evaluation of Mortar Compositions) Preparation of Mortar Compositions Ordinary portland cement, silica fume, fine aggregates, water and water-soluble vinyl copolymers synthesized in Part 1 and serving as cement dispersion agent were placed inside a hobert type mixer under the two different conditions (1) and (2) shown in Table 3 and kneaded together to obtain mortar compositions. The kinds and added amounts of these water-soluble vinyl copolymers used as cement dispersion agents are shown in Tables 4 and 5.

Method of Evaluation

For each of the mortar compositions thus prepared, the flow value was measured according to JIS (Japanese Industrial Standards)-A5201 both immediately after the kneading and after it was left for 60 minutes. Larger flow values mean better fluidity.

TABLE 4

| | | Cement Dispersion Agent | | Flow Value (mm) | | Compression Strength (kgf/cm$^2$) | |
|---|---|---|---|---|---|---|---|
| No. | Condition | Kind | Amount | Immediately After | After 60 min | 7 days | 28 days |
| 1 | (1) | A-1 | 0.9 | 320 | 312 | 980 | 1360 |
| 2 | (1) | A-2 | 1.0 | 323 | 310 | 1030 | 1410 |
| 3 | (1) | A-3 | 1.4 | 321 | 309 | 990 | 1390 |
| 4 | (1) | A-4 | 1.6 | 316 | 305 | 920 | 1370 |
| 5 | (1) | A-5 | 1.3 | 325 | 308 | 1010 | 1400 |
| 6 | (2) | A-1 | 1.0 | 325 | 320 | 1040 | 1450 |
| 7 | (2) | A-2 | 1.2 | 328 | 322 | 1060 | 1490 |

TABLE 3

| Condition | Water-to-Binder Ratio (%) | Ratio of Silica Fume in Binder (%) | Used Materials (kg/m$^3$) | | | |
|---|---|---|---|---|---|---|
| | | | Binder | | | |
| | | | Cement | Silica Fume | Water | Fine Aggregates |
| (1) | 19 | 10 | 1093 | 123 | 231 | 939 |
| (2) | 19 | 20 | 954 | 240 | 227 | 926 |

In Table 3:
Binder: Cement + silica fume;
Cement: Ordinary portland cement (specific weight = 3.16);
Silica fume: Micro Silica 940U produced by Elkem, Inc. (specific weight = 2.20, average diameter = 0.1 μm);
Fine aggregates: Sand from Oigawa River (specific weight = 2.63, finesse modulus = 2.71)

TABLE 5

| Comp. No. | Condition | Cement Dispersion Agent Kind | Cement Dispersion Agent Amount | Flow Value (mm) Immediately After | Flow Value (mm) After 60 min | Compression Strength (kgf/cm²) 7 days | Compression Strength (kgf/cm²) 28 days |
|---|---|---|---|---|---|---|---|
| 1 | (1) | R-1 | 2.5 | *3 | — | — | — |
| 2 | (1) | R-2 | 2.2 | 220 | 130 | 840 | 1100 |
| 3 | (1) | R-3 | 2.5 | *3 | — | — | — |
| 4 | (1) | R-4 | 2.5 | 250 | 140 | 850 | 1120 |
| 5 | (1) | R-5 | 2.5 | *3 | — | — | — |
| 6 | (2) | R-2 | 2.5 | *3 | — | — | — |
| 7 | (2) | R-4 | 2.5 | *3 | — | — | — |

In Tables 4 and 5:
Amount of Cement Dispersion Agent: Ratio of solid component (%) with respect to the binder;
*3: Did not become a slurry and could not be kneaded for mixing.

Part 3 (Preparation and Evaluation of Concrete Compositions) Preparation of Concrete Compositions Cement, silica fume, fine aggregates and coarse aggregates were placed inside a pan-type mixer with capacity of 50 liters under the two different conditions (3) and (4) shown in Table 6, and water-soluble vinyl copolymers synthesized in Part 1 and serving as cement dispersion agent and an antifoaming agent were kneaded together and added thereto with water for a mixing process at 20° for 3 minutes to obtain concrete compositions. The kinds and added amounts of these water-soluble vinyl copolymers used as cement dispersion agents are shown in Tables 7 and 8.

Method of Evaluation

For each of the concrete compositions thus prepared, the slump, the amount of air and the compressive strength at 7 days and 28 days were measured according respectively to JIS-A1101, JIS-A1128 and JIS-A1108. The slump was measured both immediately after the kneading and after 60 minutes. The L-flow speed was also measured by the method described in Japanese Patent Publications Tokkai 1-297528 and 1-297529 immediately after the kneading in order to evaluate the viscosity. Larger L-flow speeds indicate lower concrete viscosity and better workability. These results are shown in Tables 7 and 8.

TABLE 6

| Condition | Ratio of Water-to-binder ratio (%) | Ratio of silica fume in binder (%) | Target slump (cm) | Sand-coarse aggregate ratio (%) | Used materials (kg/m³) Binder Cement | Used materials (kg/m³) Binder Silica fume | Used materials (kg/m³) Water | Used materials (kg/m³) Fine Aggregates | Used materials (kg/m³) Coarse Aggregates |
|---|---|---|---|---|---|---|---|---|---|
| 3 | 19 | 10 | 25 | 35.6 | 663 | 74 | 140 | 568 | 1018 |
| 4 | 19 | 20 | 25 | 35.6 | 589 | 148 | 140 | 560 | 1002 |

In Table 6:
Binder: Cement + silica fume;
Cement: Ordinary portland cement (specific weight = 3.16);
Silica fume: Micro silica 940U produced by Elkem, Inc. (specific weight = 2.20, average diameter = 0.1 μm);
Fine aggregates: Sand from Oigawa River (specific weight = 2.63, finesse modulus = 2.71);
Coarse aggregates: Gravel from Danto (specific weight = 2.61, finesse module = 6.65).

TABLE 7

| Test No. | Condition | Cement dispersion agent Kind | Cement dispersion agent Amount | Presence of deforming agent | Slump (cm) Immediately after | Slump (cm) After 60 min. | Amount of air (%) | L-flow speed (cm/sec) | Compressive strength (kgf/cm$^2$) at 7 days | Compressive strength (kgf/cm$^2$) at 28 days |
|---|---|---|---|---|---|---|---|---|---|---|
| 8  | (3) | A-1 | 0.8 | Yes | 25.4 | 24.2 | 0.9 | 1.5 | 970  | 1320 |
| 9  | (3) | A-2 | 1.1 | Yes | 25.0 | 23.9 | 1.3 | 1.4 | 940  | 1290 |
| 10 | (3) | A-3 | 1.3 | Yes | 25.2 | 23.2 | 1.1 | 1.4 | 960  | 1330 |
| 11 | (3) | A-4 | 1.5 | Yes | 24.8 | 23.0 | 1.2 | 1.4 | 950  | 1310 |
| 12 | (3) | A-5 | 1.2 | Yes | 25.7 | 24.0 | 1.0 | 1.5 | 1020 | 1380 |
| 13 | (4) | A-1 | 1.0 | Yes | 25.5 | 25.0 | 1.0 | 1.6 | 1060 | 1490 |
| 14 | (4) | A-2 | 1.3 | Yes | 25.3 | 25.1 | 1.1 | 1.7 | 1040 | 1460 |
| 15 | (3) | A-1 | 0.8 | No  | 25.6 | 24.1 | 1.9 | 1.5 | 910  | 1290 |
| 16 | (3) | A-2 | 1.1 | No  | 25.1 | 23.8 | 2.0 | 1.5 | 900  | 1260 |

TABLE 8

| Comparison No. | Condition | Cement dispersion agent Kind | Cement dispersion agent Amount | Presence of anti-foaming agent | Slump (cm) Immediately after | Slump (cm) After 60 min. | Amount of air (%) | L-flow speed (cm/sec) | Compressive strength (kgf/cm$^2$) at 7 days | Compressive strength (kgf/cm$^2$) at 28 days |
|---|---|---|---|---|---|---|---|---|---|---|
| 8  | (3) | R-1 | 2.5 | No | *3   | —    | —   | —   | —   | —    |
| 9  | (3) | R-2 | 2.6 | No | 25.1 | 20.3 | 2.1 | 0.7 | 810 | 1100 |
| 10 | (3) | R-3 | 2.5 | No | *3   | —    | —   | —   | —   | —    |
| 11 | (3) | R-4 | 2.5 | No | *3   | —    | —   | —   | —   | —    |
| 12 | (3) | R-5 | 2.5 | No | *3   | —    | —   | —   | —   | —    |
| 13 | (3) | *2  | 2.3 | No | 25.7 | 20.7 | 1.9 | 0.6 | 830 | 1120 |
| 14 | (3) | A-1 | 2.4 | No | 27.8 | —    | 2.3 | —   | 660 | 890  |
| 15 | (4) | R-2 | 2.5 | No | *3   | —    | —   | —   | —   | —    |
| 16 | (3) | R-6 | 2.0 | No | 25.2 | 13.6 | 2.4 | 0.9 | 860 | 990  |
| 17 | (3) | R-7 | 2.0 | No | 25.2 | 12.9 | 2.5 | 1.0 | 850 | 970  |
| 18 | (4) | R-6 | 1.5 | No | *3   | —    | —   | —   | —   | —    |
| 19 | (4) | R-7 | 1.5 | No | *3   | —    | —   | —   | —   | —    |

In Tables 7 and 8:
Amount of cement dispersion agent: Ratio of solid component (%) with respect to the binder;
Presence of antifoaming agent: YES means addition by 0.005 weight % of ethylene oxide (6 moles) and propylene oxide (40 moles) adduct of oleyl alcohol prepared in Part 1 with respect to the binder;
*2: Condensation product of naphthalene sulfonic acid and formaldehyde;
*3: Did not become a slurry and could not be kneaded for mixing;
Comparison No. 14: the aggregates separated.

In summary, the present invention makes it possible to provide high fluidity and superior property of preventing slump loss to ultra high-strength hydraulic cement compositions with the water-to-cement ratio held extremely low in the range of 10–30% and hence to obtain high-quality ultra high-strength hardened concrete and mortar with improved workability.

What is claimed is:

1. An ultra high-strength hydraulic cement composition comprising:
   a binder comprising cement or a mixture of cement and a microscopic powder admixture containing at least one kind selected from the group consisting of silica fume, blast-furnace slag and fly ash;
   water;
   aggregates; and
   a cement dispersion agent comprising water-soluble vinyl copolymer obtained by aqueous solution radical copolymerization of a first monomer given by Formula (1), a second monomer given by Formula (2), a third monomer given by Formula (3), a fourth monomer given by Formula (4) and a fifth monomer given by Formula (5) at copolymerization ratio of 45–65/8–23/3–25/5–25/0.1–15 in molar %;
   Formulas (1), (2), (3), (4) and (5) being given respectively by

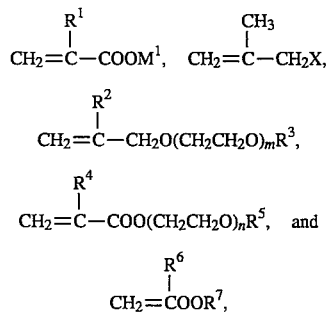

where $R^1$, $R^2$, $R^3$, $R^4$ and $R^6$ are each H or $CH_3$; $R^5$ and $R^7$ are each an alkyl group with 1–3 carbon atoms; $M^1$ is an alkali metal, an alkaline earth metal, ammonium or organic amine; m is an integer 1–30; n is an integer 5–25; and X is $-SO_3M^2$ or an organic group shown by

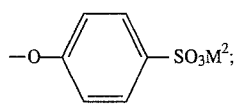

where $M^2$ is one selected from the group consisting of alkali metals, alkaline earth metals, ammonium and organic amines;

the unit content of said binder being 400–1300kg/m$^3$, the ratio of water to said binder being 10–30%, and the content of said cement dispersion agent being 0.1–2.0 weight parts with respect to 100 weight parts of said binder.

2. The ultra high-strength hydraulic cement composition of claim 1 wherein said microscopic powder admixture consists of silica fume, said silica fume being 1–30 weight % in said binder.

3. The ultra high-strength hydraulic cement composition of claim 1 which is a concrete composition, the unit content of said binder being 500–800kg/m$^3$, the water-to-binder ratio of said composition being equal to or greater than 15% and less than 25%.

4. The ultra high-strength hydraulic cement composition of claim 2 which is a concrete composition, the unit content of said binder being 500–800kg/m$^3$, the water-to-binder ratio of said composition being equal to or greater than 15% and less than 25%.

5. The ultra high-strength hydraulic cement composition of claim 1 further comprising an antifoaming agent which comprises polyoxyalkyleneglycol monoalkyl ether and/or polyoxyalkyleneglycol monoalkenyl ether, the content of said antifoaming agent being less than 0.03 weight % with respect to said binder.

6. The ultra high-strength hydraulic cement composition of claim 2 further comprising an antifoaming agent which comprises polyoxyalkyleneglycol monoalkyl ether and/or polyoxyalkyleneglycol monoalkenyl ether, the content of said antifoaming agent being less than 0.03 weight % with respect to said binder.

7. The ultra high-strength hydraulic cement composition of claim 3 further comprising an antifoaming agent which comprises polyoxyalkyleneglycol monoalkyl ether and/or polyoxyalkyleneglycol monoalkenyl ether, the content of said antifoaming agent being less than 0.03 weight % with respect to said binder.

8. The ultra high-strength hydraulic cement composition of claim 4 further comprising an antifoaming agent which comprises polyoxyalkyleneglycol monoalkyl ether and/or polyoxyalkyleneglycol monoalkenyl ether, the content of said antifoaming agent being less than 0.03 weight % with respect to said binder.

9. The ultra high-strength hydraulic cement composition of claim 1 wherein the average numerical molecular weight of said water-soluble vinyl copolymer is 2000–20000.

10. The ultra high-strength hydraulic cement composition of claim 2 wherein the average numerical molecular weight of said water-soluble vinyl copolymer is 2000–20000.

11. The ultra high-strength hydraulic cement composition of claim 3 wherein the average numerical molecular weight of said water-soluble vinyl copolymer is 2000–20000.

12. The ultra high-strength hydraulic cement composition of claim 4 wherein the average numerical molecular weight of said water-soluble vinyl copolymer is 2000–20000.

13. The ultra high-strength hydraulic cement composition of claim 5 wherein the average numerical molecular weight of said water-soluble vinyl copolymer is 2000–20000.

14. The ultra high-strength hydraulic cement composition of claim 6 wherein the average numerical molecular weight of said water-soluble vinyl copolymer is 2000–20000.

15. The ultra high-strength hydraulic cement composition of claim 7 wherein the average numerical molecular weight of said water-soluble vinyl copolymer is 2000–20000.

16. The ultra high-strength hydraulic cement composition of claim 8 wherein the average numerical molecular weight of said water-soluble vinyl copolymer is 2000–20000.

\* \* \* \* \*